United States Patent
Sequeira et al.

(10) Patent No.: US 10,402,605 B2
(45) Date of Patent: Sep. 3, 2019

(54) DYNAMICALLY CHANGING A TAG'S DISPLAYED CONTENT RESPONSIVE TO DETECTED CUSTOMER HANDLING THEREOF

(71) Applicants: Melwyn F. Sequeira, Plantation, FL (US); Hubert A. Patterson, Boca Raton, FL (US); Mohammad Mohiuddin, Boynton Beach, FL (US)

(72) Inventors: Melwyn F. Sequeira, Plantation, FL (US); Hubert A. Patterson, Boca Raton, FL (US); Mohammad Mohiuddin, Boynton Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 15/806,030

(22) Filed: Nov. 7, 2017

(65) Prior Publication Data
US 2018/0276690 A1   Sep. 27, 2018

Related U.S. Application Data

(60) Provisional application No. 62/476,532, filed on Mar. 24, 2017.

(51) Int. Cl.
| | |
|---|---|
| *G06K 7/10* | (2006.01) |
| *G06Q 10/08* | (2012.01) |
| *G08B 13/24* | (2006.01) |
| *G06F 3/0484* | (2013.01) |
| *G06Q 30/02* | (2012.01) |

(Continued)

(52) U.S. Cl.
CPC ....... *G06K 7/10366* (2013.01); *G06Q 10/087* (2013.01); *G06Q 30/0201* (2013.01); *G06Q 30/0202* (2013.01); *G06T 11/60* (2013.01); *G08B 13/248* (2013.01); *G08B 13/2417* (2013.01); *G08B 13/2462* (2013.01);
(Continued)

(58) Field of Classification Search
CPC .......... G06Q 30/0201; G06Q 30/0202; G06Q 30/0205; G06Q 10/087; G06Q 20/206; G06K 7/10366; G06T 11/60; G08B 13/2417; G08B 13/248; G06F 3/04842
See application file for complete search history.

(56) References Cited

U.S. PATENT DOCUMENTS

| | | | |
|---|---|---|---|
| 2004/0144842 A1* | 7/2004 | Brignone | G06Q 10/087 235/385 |
| 2007/0136152 A1 | 6/2007 | Dunsker et al. | |

(Continued)

*Primary Examiner* — Stephen G Sherman
(74) *Attorney, Agent, or Firm* — Fox Rothschild LLP; Robert J. Sacco; Carol E. Thorstad-Forsyth

(57) ABSTRACT

Systems and methods for dynamically changing displayed content of a first tag. The methods comprising: detecting when an individual is in proximity to the first tag or when an item, to which the first tag is coupled, is being handled by the individual; identifying at least one first accessory for the item or at least one first related product that can be used in conjunction with or as an alternative to the item; obtaining information for the identified at least one first accessory or related product that is to be presented to the individual; and dynamically changing the displayed content of the first tag to include the obtained information while the individual is still in proximity to the first tag or handling the item.

18 Claims, 8 Drawing Sheets

(51) Int. Cl.
*G06T 11/60* (2006.01)
*G06Q 20/20* (2012.01)

(52) U.S. Cl.
CPC ....... *G06F 3/04842* (2013.01); *G06Q 20/206* (2013.01); *G06Q 30/0205* (2013.01)

(56) References Cited

U.S. PATENT DOCUMENTS

| | | | |
|---|---|---|---|
| 2009/0183403 A1* | 7/2009 | Wright | G06F 3/147 40/444 |
| 2011/0099061 A1* | 4/2011 | Giffin | G06Q 30/02 705/14.49 |
| 2014/0210624 A1 | 7/2014 | Wandel et al. | |
| 2016/0134930 A1* | 5/2016 | Swafford | A47F 5/0068 725/80 |

* cited by examiner

DYNAMICALLY CHANGING A TAG'S DISPLAYED CONTENT RESPONSIVE TO DETECTED CUSTOMER HANDLING THEREOF

CROSS-REFERENCE TO RELATED APPLICATIONS

The present application claims priority to U.S. Patent Application Ser. No. 62/476,532 filed on Mar. 24, 2017, the entirety of which is incorporated herein by reference.

FIELD

This document relates generally to intelligence and security systems (e.g., for retail applications). More particularly, this document relates to implementing systems and methods for dynamically changing a tag's displayed content in response to detected customer handling of the item to which the tag is coupled.

BACKGROUND

As digitization of merchandise and Point-Of-Sales ("POS") marketing evolves and the quest to learn more about shopper trends and demographics continues, retailers are looking to gather data streams from an integrated array of sensors and use enterprise or shelf-based analytics to enhance shopper experience.

As an example, RFID is typically used for item level identification. Wireless communications interactions with consumers are achieved via their mobile devices (e.g., using Bluetooth, Near Field Communication ("NFC") and/or WiFi technology). Such wireless communications are being used extensively in retail stores seeking to gain more knowledge about the customer and their shopping trends.

By integrating a plurality of sensors into a smart electronic tag or shelf label, and allowing the customer to interact with the smart electronic label/tag, the customer can obtain much more information about the item they intend to purchase or peruse, while the enterprise gains additional knowledge about their customer.

There are several smart shelf systems containing electronic labels and electronic tags used to display information such as item description, pricing, SKU, store promotions, etc. These labels mainly use E-ink or LCD displays to indicate their item level information. Several big box retailers have begun to deploy and test the viability of such systems in an effort to manage price, promotions and various other item level information.

SUMMARY

The present disclosure concerns implementing systems and methods for dynamically changing displayed content of a first tag. The methods comprise: detecting when an individual is in proximity to the first tag or when an item, to which the first tag is coupled, is being handled by the individual; identifying at least one first accessory for the item or at least one first related product that can be used in conjunction with or as an alternative to the item; obtaining information for the identified at least one first accessory or related product that is to be presented to the individual; and dynamically changing the displayed content of the first tag to include the obtained information while the individual is still in proximity to the first tag or handling the item.

The first tag may receive a user-software interaction to view additional information for the at least one first accessory or related product. In response to the user-software interaction, the tag can obtain and display the additional information for the at least one first accessory or related product.

In some scenarios, the methods also comprise determining whether the first tag is where the first tag should be located within a facility. When a determination is made that the first tag is not where the first tag should be located within the facility, the displayed content of the first tag is changed to (a) indicate that the first tag is currently misplaced and/or (b) indicate that there is a larger selection of the same or similar items in a given area of the facility.

In those or other scenarios, the at least one first accessory is selected from a plurality of accessories based on the item's current location and the locations of the accessories. Additionally or alternatively, the at least one first related product is selected from a plurality of related products based on the item's current location and locations of the related products.

In those or other scenarios, the methods further comprise: monitoring the first tag's location within a facility to detect when the first tag's physical location changes; and dynamically changing the displayed content to include information for at least one second accessory or related product that is physically located closest to the first tag's new physical location.

In those or other scenarios, the methods additionally comprise: determining if the item is on display in response to a detection that the individual is in proximity to the first tag or that the item is being handled by the individual; determining an operational state of the item if a determination is made that the item is on display; and performing at least one remedial measure when the operational state is not one in which the item's features are being adequately presented to the individual. The at least one remedial measure includes, but is not limited to, causing the first tag's display to indicate that a fully operational item of the same type is on display in a given area of a facility; causing a second tag of the fully operational displayed item to include an output for capturing the individual's interest; or notifying store personnel of the individual's interest in the item and the item's current operational state.

DESCRIPTION OF THE DRAWINGS

The present solution will be described with reference to the following drawing figures, in which like numerals represent like items throughout the figures.

DETAILED DESCRIPTION

Figure 1:
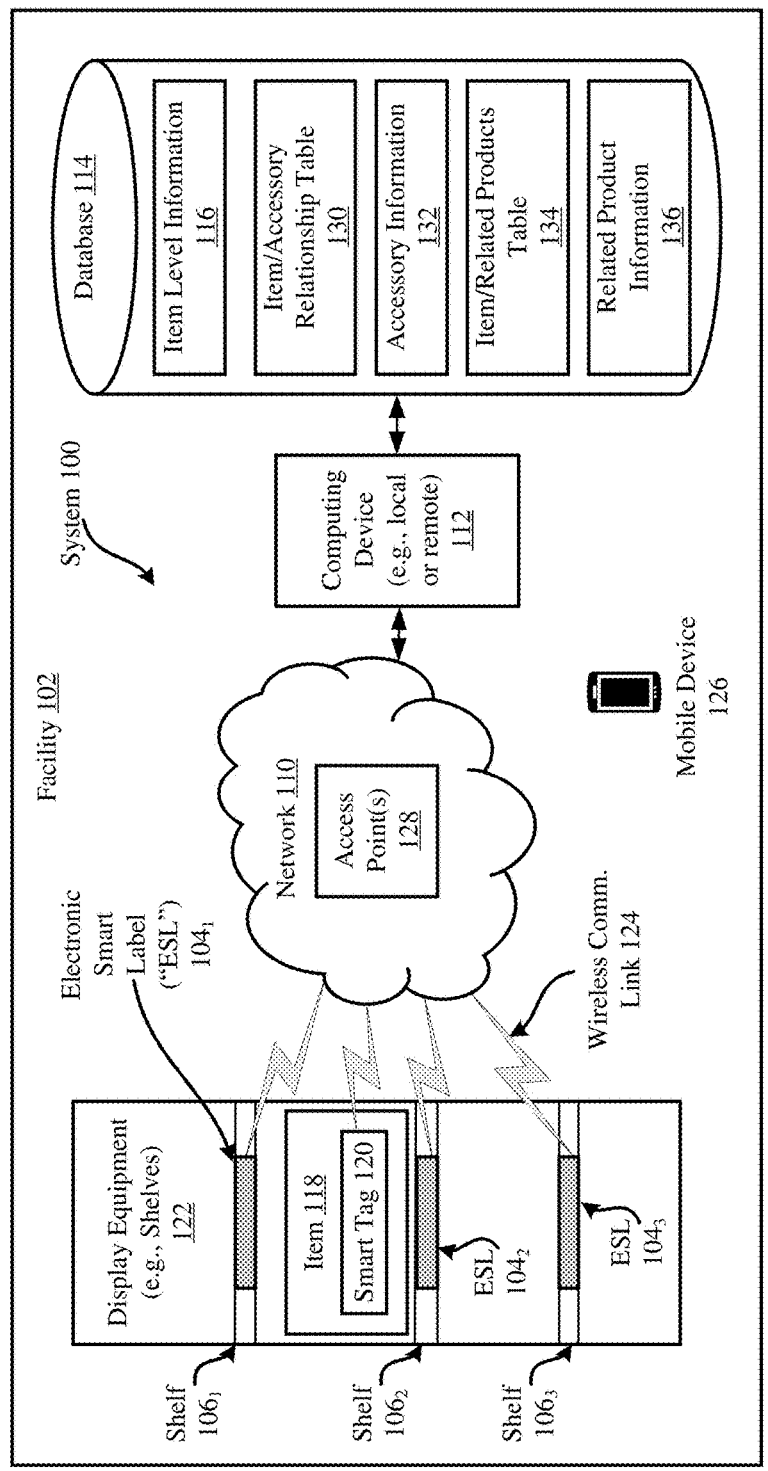
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution generally concerns implementing systems and methods for dynamically changing a tag's displayed content in response to detected customer handling of an item to which the tag is coupled. The methods generally involve: sensing movement of a tag indicating that the tag is being handled by an individual (e.g., a customer); optionally communicating a message from the tag to an enterprise system in response to the sensed movement; identifying any accessories for the item to which the tag is coupled and/or related products that can be used in conjunction with or as an alternative to the item; obtaining information associated with the identified accessories and/or related products; optionally communicating the information to the tag; and changing the display content of the tag to include the received information associated with the identified accessories (e.g., accessory product information (product description and/or price), promotional information, and/or sale information) and/or related products (e.g., related product information (product description and/or price), promotional information, and/or sale information). An accessory includes, but is not limited to, a useful auxiliary item that can be attached to or removed from an item (e.g., a drill bit or battery of a drill). A related product includes, but is not limited to, a product that can be used in conjunction with or as an alternative to another product (e.g., diaper rash cream which can be used when changing a diaper, or a first diaper can be used as an alternative to another diaper).

The present solution can also use the current location of the tag to select the accessories and/or related products which are closest to the tag at any given time. As the tag travels through the store, different accessories and/or related products are selected. As such, information for different accessories and/or related products is displayed on the smart tag at different times while the tag is traveling through the store. Thus, the tag provides dynamically changing displayed content for improving an individual's shopping experience and/or increasing a retail store's overall sales.

Referring now to FIG. 1, there is provided an illustration of an illustrative system 100. System 100 is entirely or at least partially disposed within a facility 102. The facility 102 can include, but is not limited to, a manufacturer's facility, a distribution center facility, a retail store facility or other facility within a supply chain.

As shown in FIG. 1, at least one item 118 resides within the facility 102. The item 118 has a smart tag 120 coupled thereto. This coupling is achieved via an adhesive (e.g., glue), a mechanical coupler (e.g., straps, clamps, snaps, etc.), a weld, chemical bond or other means. The smart tag 120 is generally configured to provide a visual and/or auditory output of item level information, accessory information, and/or related product information. The item level information includes, but is not limited to, an item description, item nutritional information, a promotional message, an item regular price, an item sale price, a currency symbol, and/or a source of the item. The accessory information includes, but is not limited to, an accessory description, accessory nutritional information, a promotional message, an accessory regular price, an accessory sale price, a currency symbol, a source of the accessory, and/or an accessory location in the facility. The related product information includes, but is not limited to, a related product description, related product nutritional information, a promotional message, a related product regular price, a related product sale price, a currency symbol, a source of the related product, and/or a related product location in the facility.

The smart tag 120 will be described in detail below in relation to FIGS. 2-4. The item level information, accessory information and/or related product information can be output in a format selected from a plurality of formats based on a geographic location of the item, a date, and/or an item pricing status (e.g., whether the item is on sale). In a display context, the format is defined by a font parameter, a color parameter, a brightness parameter, and/or a display blinking parameter. In an auditory context, the format is defined by a volume parameter, a voice tone parameter, and/or a male/female voice selection parameter.

The item 118 is disposed on display equipment 122. The display equipment includes, but is not limited to, shelves $106_1$-$106_3$, display cabinets, and/or exhibit cases. In the shelf scenario, each shelf $106_1$-$106_3$ may have an Electronic Smart Label ("ESL") affixed thereto. ESLs are well known in the art, and therefore will not be described herein. Still, it should be understood that the ESLs display information relating to the items stored on the respective shelves. In some scenarios, the ESLs are connected to a corporate network via long-range radio technology. In this case, the ESLs may communicate with the ESTs via a short-range or long-range radio and provide informational updates thereto.

The smart tag 120 and ESLs $104_1$-$104_3$ comprise wireless communication components that enable the communication of item level information 116, accessory information 132 and/or related product information 136 thereto and/or therefrom. The wireless communication components can implement one or more different types of communication technology. The communication technologies can include, but are not limited to, Radio Frequency ("RF") communication technology; Bluetooth technology; WiFi technology; Sub GHz technology; beacon technology; and/or LiFi technology. Each of the listed types of communication technology are well known in the art, and therefore will not be described herein.

The item level information 116, accessory information 132, and/or related product information 136 is provided to the smart tag and ESLs from a computing device 112 via a network 110. The computing device 112 can be local to the facility 102 as shown in FIG. 1 or remote from the facility 102. The computing device 112 will be described in detail below in relation to FIG. 5. However, at this time, it should be understood that the computing device 112 is configured to: write data to and read data from a database 114, smart tag 120 and/or ESLs $104_1$-$104_3$; and/or perform language and currency conversion operations using item level information and/or accessory information obtained from the database 114, smart tag 120 and/or ESLs $104_1$-$104_3$. The data can include, but is not limited to, item level information 116, accessory information 132, and/or related product information 136.

Accordingly, the computing device 112 facilitates updates to the item level information, accessory information, and/or related product information output from the smart tags and/or ESLs. Such information updating can be performed periodically, in response to instructions received from an associate (e.g., a retail store employee), in response to a detected change in the item level, accessory and/or related product information, in response to a detection that an individual is in proximity to the smart tag or ESL, and/or in response to any motion or movement of the smart tag. For example, if a certain product is placed on sale, then the sale price for that product is transmitted to access point 128, which in turn transmits the sale price to each smart tag/ESL associated with that product. The sale price is then output from the smart tags/ESLs. The present solution is not limited to the particulars of this example.

The network 110 interconnects the computing device 112 with at least one access point 128. Network 110 can be a wired or wireless network facilitating communication between computing device 112 and the access point 128. The access point 128 receives the item level information 116, accessory information 132 and/or related product information 136 from the computing device 112, optionally translates this information, and sends it to the smart tag 120 and/or ESLs $104_1$-$104_3$ via wireless communication links 124.

Although a single computing device 112 is shown in FIG. 1, the present solution is not limited in this regard. It is contemplated that more than one computing device can be implemented. Also, the present solution is not limited to the illustrative system architecture described in relation to FIG. 1. For example in other scenarios, the present solution is used in a system such as that disclosed in U.S. Patent Publication No. 2012/0326849 to Relihan et al. (incorporated herein by reference).

During operations of system 100, the content displayed on the display screens of the smart tags 120 and ESLs $104_1$, . . . , $104_3$ are dynamically controlled based upon various tag or item related information. The tag or item related information, includes, but is not limited to, first information indicating that an individual is in proximity to the smart tag and/or ESL, second information indicating that the item 118 is being handled by an individual, third information indicating a current location of the smart tag 120, and/or fourth information identifying any accessories for the item 118. The first, second and third information can be derived based on sensor data generated by sensors local to the smart tag 120. Accordingly, the smart tag 120 comprises one or more sensors to detect its current location, detect any individuals in proximity thereto, and/or detect any motion or movement thereof. The sensors include, but are not limited to, an Inertial Measurement Unit ("IMU"), a vibration sensor, an accelerometer, a gyroscope, a proximity sensor, a microphone, and/or a beacon communications device. The fourth information can be stored local to the smart tag 120 or in a remote datastore 114 as accessory information 132. The manner in which the displayed content is dynamically changed will become more evident as the discussion progresses.

In some scenarios, a sensor embedded in the smart tag 120 detects when an individual is in proximity to and/or is handling the item 118 to which the smart tag is coupled. When such a detection is made, the smart tag 120 retrieves accessory information from a local memory or a remote datastore 114. For example, the item comprises a battery operated drill. In this case, the accessories include batteries, drill bits, and various other attachments that could be used with the drill. Accordingly, the accessory information includes identifiers, descriptions, pricing and/or locations of the listed accessories. The smart tag's display is then dynamically changed to include all or some of the accessory information (e.g., the display indicates that the drill takes 4 Y size batteries that are located in isle X of the facility, and that the individual will obtain a 20% price reduction if purchased today along with the drill). The present solution is not limited to the particulars of this example.

In those or other scenarios, a sensor embedded in the smart tag 120 detects when an individual is in proximity to and/or is handling the item 118 to which the smart tag is coupled. When such a detection is made, the smart tag 120 retrieves the item's unique identifier from its local memory, and wirelessly communicates the same to a remote computing device 112. The computing device 112 uses the item's unique identifier and the item/accessory relationship table 130 to determine if there are any accessories associated therewith. If no accessories exist for the item 118, the computing device 112 used the item level information 116 to determine one or more characteristics of the item 118. For example, the item includes diapers of a specific size and/or brand. The computing device then uses the item/related products table 134 to identify: (1) other diapers of the same size and/or brand with different characteristics (e.g., diapers of the same size and/or brand which are available (a) in an extra absorbent material for nighttime, (b) with aloe for sensitive skin, and (c) with various printed boy and/or girl patterns); and/or (2) other products which are typically used in conjunction with diapers (e.g., diaper rash cream and/or wipes). Related product information 136 for the identified related products is then retrieved by the computing device 112, and sent to the smart tag 120 for display thereby. The individual can perform user-software interactions with the smart tag to obtain further information about a related product of interest. The present solution is not limited to the particulars of this example.

In those or other scenarios, a sensor embedded in the smart tag 120 detects when an individual is in proximity to and/or is handling the item 118 to which the smart tag is coupled. When such a detection is made, the smart tag 120 determines if it is currently located where it is supposed to be within the facility 102 (e.g., aisle 2). If not, then the smart tag 120 changes its display to indicate that it is currently misplaced and that there is a larger selection of colors and sizes of such items in a given area (e.g., aisle 2) of the facility 102. The present solution is not limited in this regard.

In those or yet other scenarios, a sensor embedded in the smart tag 120 detects when an individual is in proximity to and/or is handling the item 118 to which the smart tag is coupled. When such a detection is made, the smart tag 120 communicates its unique identifier and a notification of said detection to a remote computing device 112. The remote computing device 112 performs operations to identify the item (e.g., a TV) to which the tag is coupled. If the item is on display, then the computing device 112 performs operations to determine the item's current operational state (e.g., currently turned off). If the operational state is one in which the item's features are not being adequately presented to the individual, then the computing device can take one or more remedial measures. A look-up table or pre-defined rules can be used to determine if the operational state is one in which the item's features are not being adequately presented to the individual. The remedial measures can include, but are not limited to, causing the smart tag's display to indicate that a fully operational item of the same type is on display in a given area of a facility, causing the smart tag of the fully operational displayed item to include an output for capturing the individual's interest, and/or notifying store personnel of the individual's interest in the item and the item's current operational state. The store personnel can use this information to determine whether (s)he should go to the item's location and interact with the item to change its operational state. The present solution is not limited to the particulars of this example.

Figure 2:
FIG. 2 is an illustration of an exemplary Electronic Smart Tag ("EST").

Referring now to FIG. 2, there is an illustration of an exemplary EST 200 displaying item level information. An exemplary architecture for the EST 200 is provided in FIGS. 3-4. Smart tag 120 and/or ESLs 104$_1$-104$_3$ of FIG. 1 is/are the same as or substantially similar to EST 200. As such, the discussion of EST 200 is sufficient for understanding the smart tag 120 and/or ESLs 104$_1$-104$_3$ of FIG. 1.

Figure 3:
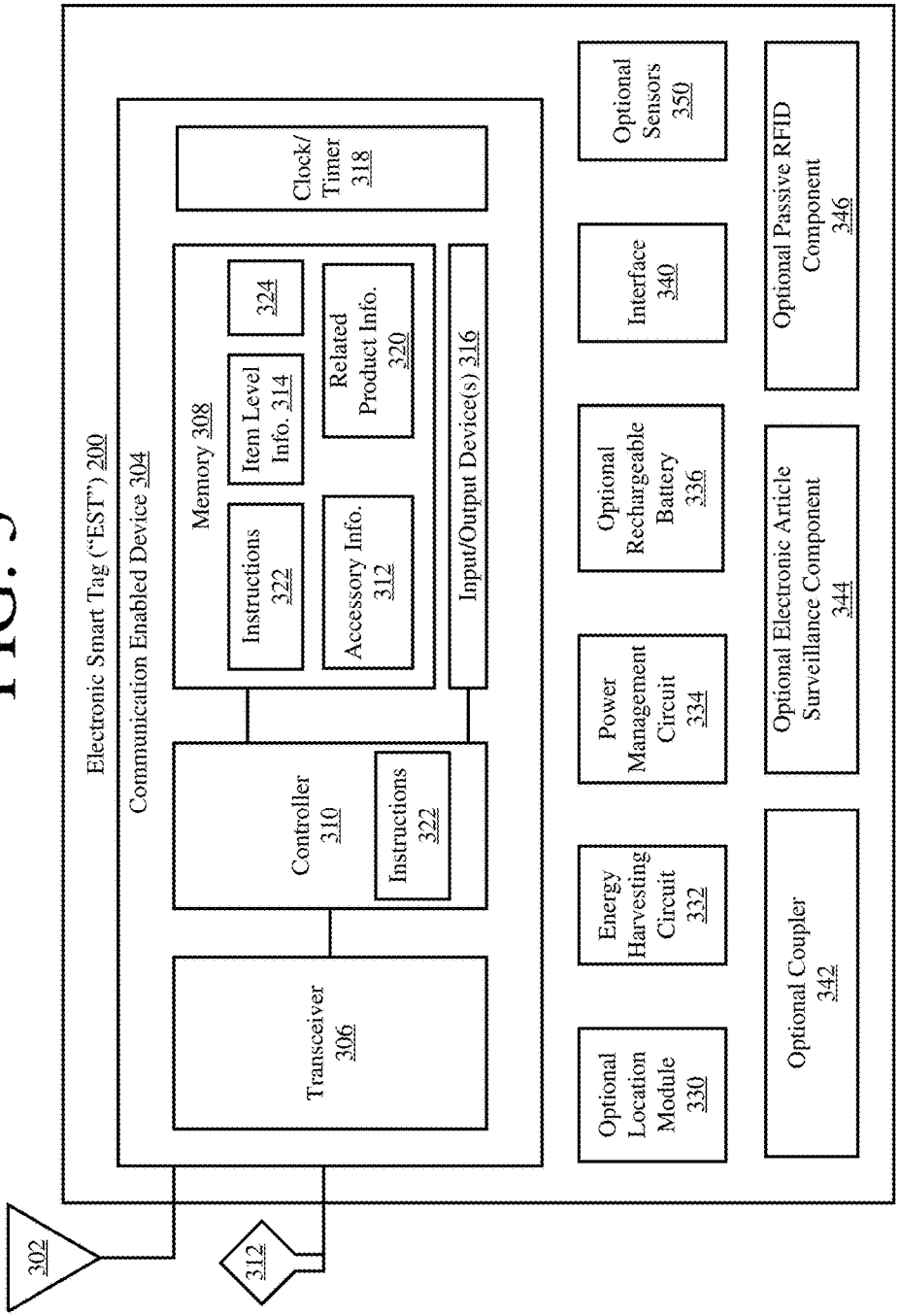
FIG. 3 is a block diagram of an illustrative architecture for the EST of FIG. 2.

The EST 200 can include more or less components than that shown in FIG. 3. However, the components shown are sufficient to disclose an illustrative embodiment implementing the present solution. Some or all of the components of the EST 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative EST 200 configured to facilitate improved inventory management, merchandise sales, and/or customer experience. In this regard, the EST 200 is configured for allowing data to be exchanged with an external device (e.g., computing device 112 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is)are employed: Radio Frequency ("RF") communication technology; Bluetooth technology; WiFi technology; Sub-GHz technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 306-318 shown in FIG. 3 may be collectively referred to herein as a communication enabled device 304, and include a memory 308 and a clock/timer 318. Memory 308 may be a volatile memory and/or a non-volatile memory. For example, the memory 308 can include, but is not limited to, Random Access Memory ("RAM"), Dynamic RAM ("DRAM"), Static RAM ("SRAM"), Read Only Memory ("ROM") and flash memory. The memory 308 may also comprise unsecure memory and/or secure memory.

In some scenarios, the communication enabled device 304 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 308. Notably, the communication protocols can be downloaded to the device at any given time. The initial/default role (being an RFID, WiFi, LiFi, etc. tag) can be assigned at the deployment thereof. If the user desires to use another protocol at a later time, the user can remotely change the communication protocol of the deployed EST 200. The update of the firmware, in case of issues, can also be performed remotely.

As shown in FIG. 3, the communication enabled device 304 comprises at least one antenna 302, 312 for allowing data to be exchanged with the external device via a wireless communication technology (e.g., an RFID technology, an NFC technology and/or a SRC technology). The antenna 302, 312 is configured to receive signals from the external device and/or transmit signals generated by the communication enabled device 304. In some scenarios, the antenna 302, 312 comprises a near-field or far-field antenna. The antennas includes, but are not limited to, a chip antenna or a loop antenna.

The communication enabled device 304 also comprises a transceiver 306. Transceivers are well known in the art, and therefore will not be described herein. However, it should be understood that the transceiver 306 generates and transmits signals (e.g., RF carrier signals) to external devices, as well as receives signals (e.g., RF signals) transmitted from external devices. In this way, the communication enabled device 304 facilitates the registration, identification, location and/or tracking of an item (e.g., item 118 of FIG. 1) to which the EST 200 is coupled. The communication enabled device 304 also facilitates the automatic and dynamic modification of item level information, accessory information, and/or related product information that is being or is to be output from the EST 200 in response to certain trigger events. The trigger events can include, but are not limited to, the EST's arrival at a particular facility (e.g., facility 102 of FIG. 1), the EST's arrival in a particular country or geographic region, a date occurrence, a time occurrence, a price change, the reception of user instructions, the detection of an individual in proximity to an item (e.g., item 118 of FIG. 1) to which the EST is coupled, and/or the detection motion/movement of an item (e.g., item 118 of FIG. 1) to which the EST is coupled.

Item level information 314, accessory information 312, related product information 320, and/or other information 324 associated with the identification, location and/or motion/movement of the EST 200 can be stored in memory 308 of the communication enabled device 304 and/or communicated to other external devices (e.g., computing device 112 of FIG. 1 and/or mobile device 126 of FIG. 1) via transceiver 306 and/or interface 340 (e.g., an Internet Protocol or cellular network interface). For example, the communication enabled device 304 can communicate information specifying a timestamp, a unique identifier, item description, item price, a currency symbol, location information, and/or motion/movement information to an external computing device. The external computing device (e.g., server) can then store the information in a datastore (e.g., datastore 114 of FIG. 1) and/or use the information during language and/or currency conversion operations and/or during tag display change operations.

The communication enabled device 304 also comprises a controller 310 and input/output devices 316. The controller 310 can also execute instructions 322 implementing methods for facilitating item inventorying, merchandise sales and/or customer satisfaction. In this regard, the controller 310 includes a processor (or logic circuitry that responds to instructions) and the memory 308 includes a computer-readable storage medium on which is stored one or more sets of instructions 322 (e.g., software code) configured to implement one or more of the methodologies, procedures, or functions described herein. The instructions 322 can also reside, completely or at least partially, within the controller 310 during execution thereof by the EST 200. The memory 308 and the controller 310 also can constitute machine-readable media. The term "machine-readable media", as used here, refers to a single medium or multiple media (e.g., a centralized or distributed database, and/or associated caches and servers) that store the one or more sets of instructions 322. The term "machine-readable media", as used here, also refers to any medium that is capable of storing, encoding or carrying a set of instructions 322 for execution by the EST 200 and that cause the EST 200 to perform any one or more of the methodologies of the present disclosure.

The input/output devices can include, but are not limited to, a display (e.g., an E Ink display, an LCD display and/or an active matrix display), a speaker, a keypad and/or light emitting diodes. The display is used to present item level information, accessory information, and/or related product information in a textual format and/or graphical format. Similarly, the speaker may be used to output item level information, accessory information, and/or related product information in an auditory format. The speaker and/or light emitting diodes may be used to output alerts for drawing a person's attention to the EST 200 and/or for notifying the person of a particular pricing status (e.g., on sale status) of the item to which the EST is coupled.

The clock/timer 318 is configured to determine a date, a time, and/or an expiration of a pre-defined period of time. Technique for determining these listed items are well known in the art, and therefore will not be described herein. Any known or to be known technique for determining these listed items can be used herein without limitation.

The EST 200 also comprises an optional location module 330. The location module 330 is generally configured to determine the geographic location of the EST at any given time. For example, in some scenarios, the location module 330 employs Global Positioning System ("GPS") technology and/or Internet based local time acquisition technology. The present solution is not limited to the particulars of this example. Any known or to be known technique for determining a geographic location can be used herein without limitation.

The optional coupler 342 is provided to securely or removably couple the EST 200 to an item (e.g., item 118 of FIG. 1). The coupler 342 includes, but is not limited to, a mechanical coupling means (e.g., a strap, clip, clamp, snap) and/or adhesive (e.g., glue or sticker). The coupler 342 is optional since the coupling can be achieved via a weld and/or chemical bond.

The EST 200 can also include an optional rechargeable battery 336, an optional Electronic Article Surveillance ("EAS") component 344, and/or an operational passive/active/semi-passive RFID component 346. Each of the listed optional components 336, 344, 346 is well known in the art, and therefore will not be described herein. Any known or to be known battery, EAS component and/or RFID component can be used herein without limitation.

As shown in FIG. 2, the EST 200 further comprises an energy harvesting circuit 332 and a power management circuit 334 for ensuring continuous operation of the EST 200 without the need to change a battery. In some scenarios, the energy harvesting circuit 302 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy.

The energy harvesting circuit 332 can operate in two (2) ways. First, the energy harvesting circuit 332 can harvest energy from an available source while online (i.e., when the EST 200 is attached to merchandise). Second, the energy harvesting circuit 332 can harvest energy while offline (i.e., when the EST 200 is detached from merchandise) via a charging station/bin. This ensures that the EST 200 is fully charged when the EST is ready to be deployed or go online.

The energy harvesting circuit 332 can also be supplemented with bigger harvesters and/or a mains power source. In this case, the energy harvesting circuit 332 can be placed closer to its primary source (e.g., a solar panel on top of a shelf) and power from there can be distributed over two (2) wires. The design allows multiple labels to be connected to a single harvester circuit. The harvester circuit can be replaces with the mains power source.

The EST 200 may also include optional sensors 350 employing environmental and proximity sensing technology. The sensors 350 can include, but are not limited to, a light sensor, a fluid/liquid/humidity sensor, an IR detector, a camera, a proximity sensor, an IMU, an accelerometer, a gyroscope, and/or an RF detection unit. The input/output devices 316 (e.g., the display) can be turned off when a person is not located in proximity thereto. This capability is useful when the input/output devices 316 (e.g., the display) is not considered low power.

The power management circuit 334 is generally configured to control the supply of power to components of the EST 200. In the event all of the storage and harvesting resources deplete to a point where the EST 200 is about to enter a shutdown/brownout state, the power management circuit 334 can cause an alert to be sent from the EST 200 to a remote device (e.g., computing device 112 of FIG. 1). In response to the alert, the remote device can inform an associate (e.g., a store employee) so that (s)he can investigate why the EST 200 is not recharging and/or holding charge.

The power management circuit 334 is also capable of redirecting an energy source to the EST's 200 electronics based on the energy source's status. For example, if harvested energy is sufficient to run the EST's 200 function, the power management circuit 334 confirms that all of the EST's 200 storage sources are fully charged such that the EST's 200 electronic components can be run directly from the harvested energy. This ensures that the EST 200 always has stored energy in case harvesting source(s) disappear or lesser energy is harvested for reasons such as drop in RF, light or vibration power levels. If a sudden drop in any of the energy sources is detected, the power management circuit 334 can cause an alert condition to be sent from the EST 200 to the remote device (e.g., computing device 112 of FIG. 1). At this point, an investigation may be required as to what caused this alarm. Accordingly, the remote device can inform the associate (e.g., a store employee) so that (s)he can investigate the issue. It may be that other merchandise are obscuring the harvesting source or the item is being stolen.

Figure 4:
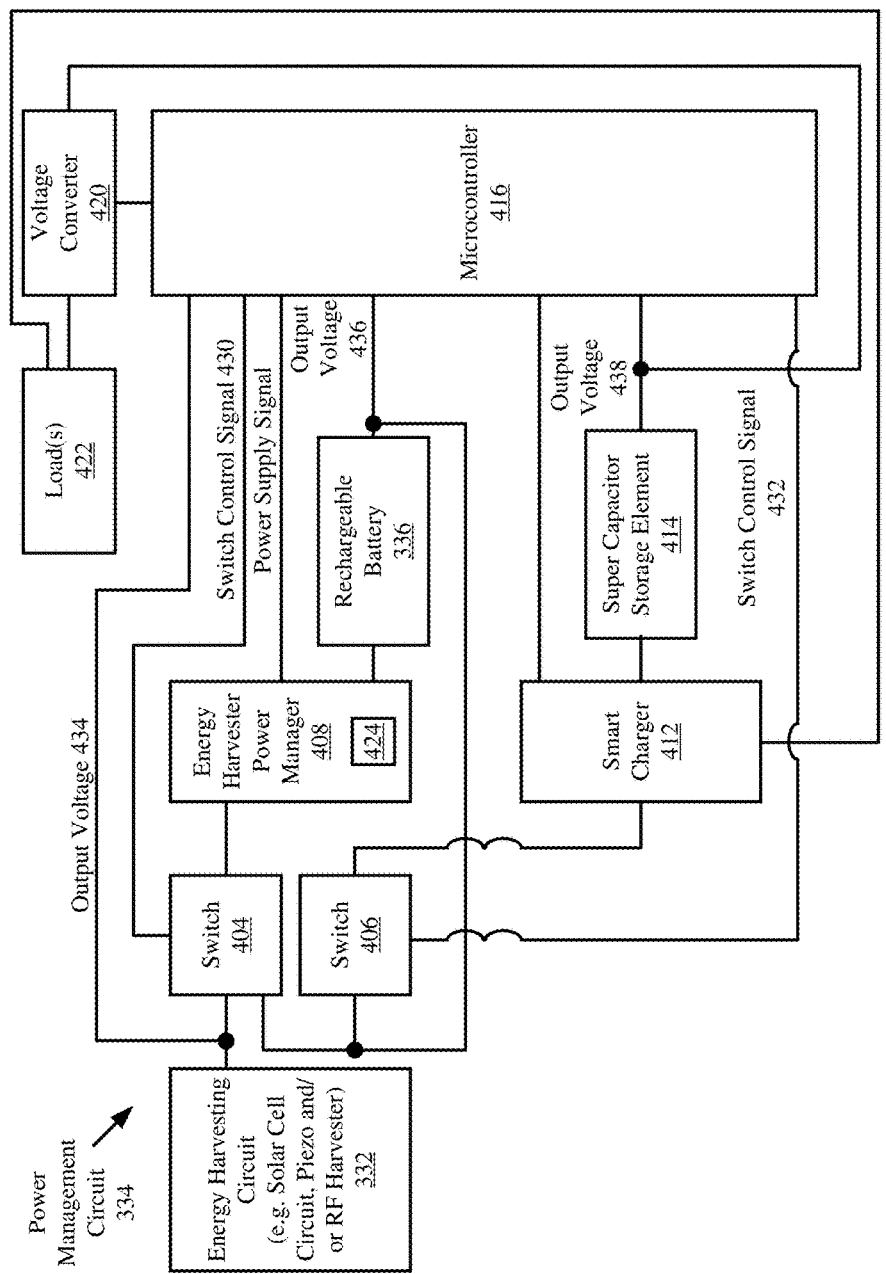
FIG. 4 is a block diagram of an illustrative architecture for a power management circuit of the EST of FIGS. 2-3.

Referring now to FIG. 4, there is provided a block diagram of an exemplary architecture 400 for the power management circuit 334 of the EST 200. The power management circuit 334 is not limited to the particular architecture shown in FIG. 4. In this regard, it should be understood that that power management circuit 334 can include more or less components than that shown in FIG. 4.

The power management circuit 334 is configured to provide a way in which the EST 200 is: deployable as a plug-n-play energy harvested wireless sensor that is ready to function as soon as it is turned on; and a self-sustaining sensor system wherein its power source would virtually never need to be replaced. In this regard, the power management circuit 334 is electrically connected to the energy harvesting circuit 332 and the optional rechargeable battery 336. The power management circuit 334 comprises switches 404, 406, an Energy Harvester Power Manager ("EHPM") 408, a Super Capacitor ("SC") storage element 414, a smart charger 412 for the SC storage element, a microcontroller 416, and a DC-DC voltage converter 420 electrically connected to a load(s) 422. The microcontroller 416 can be the same as or separate/distinct from the controller 310 of FIG. 3. The load 422 can include, but is not limited to, components 304, 330, 340, 350, 344 and/or 346 of FIG. 3.

In some scenarios, the energy harvesting circuit 332 comprises a solar cell circuit. The present solution is not limited in this regard. Other types of energy harvesting circuits can be used herein that generate a relatively low amount of output power.

At initial power up of the EST 200, the SC storage element 414 is assumed to be in a completely discharged state. Thus, the initial charge of the SC storage element 414 is at a level of approximately or substantially equal to zero volts. However, the rechargeable battery 336 is in a quasi-discharged state in which its initial charge is at a level greater than zero volts (e.g., 3 volts). As such, the rechargeable battery 336 has a sufficient amount of initial stored energy to nearly instantaneously enable operations of the control electronics of the EST 200. In this regard, an output voltage 436 is supplied from the rechargeable battery 336 to the EHPM 408 via switch 404, whereby operations of boost converters 424 contained in the EHPM 408 are started immediately after turning on the EST 200. The output voltage 436 is also supplied from the rechargeable battery 336 to the microcontroller 416 via the EHPM 408.

The available power from rechargeable battery is also used at this time to charge the SC storage element 414. In this regard, the output voltage 436 of the rechargeable battery 336 is supplied to the SC storage element 414 via switch 406 and smart charger 412, whereby charging of the SC storage element is expedited. An output voltage 438 of the SC storage element is supplied to the load(s) 422 via the voltage converter 420. The EST 200 is considered fully operational when the output voltage 438 reaches a level (e.g., 3.8 V) that is sufficient to cause the load(s) to perform the intended operations thereof.

Throughout operation of the EST 200, the microcontroller 416 monitors the output voltage 434 of the solar cell circuit 402, as well as the output voltage 436 of the rechargeable battery and the output voltage 438 of the SC storage element 414. Once the output voltage 438 of the SC storage element 414 reaches a desired voltage (e.g., 3.8 V) after system activation (or powering on), the microcontroller 416 enables a timer to time the charging of the SC storage element 414. After a pre-determined time period (e.g., 6 hours), an assumption is made that the SC storage element 414 has reached its leakage current equilibrium, and therefore no longer needs to be charged. In effect, the microcontroller 416 may optionally perform operations at this time to terminate the supply of output voltage 436 to the SC storage element 414 via switch 406 and smart charger 412.

When the output voltage 438 of the SC storage element 414 falls below a threshold value (e.g., 3.3 V), the microcontroller 416 communicates a switch control signal 432 to switch 406 so as cause the output voltage 436 of the rechargeable battery 410 to once again be supplied to the SC storage element 414 via the smart charger 412. Output voltage 436 is supplied to the SC storage element 414 until the output voltage 438 thereof exceeds an upper threshold value. In effect, the SC storage element 414 is recharged whereby the energy expended while driving load(s) 422 is(are) restored.

When the solar cell circuit 402 is active, the output voltage 434 of the solar cell circuit 402 is supplied to the rechargeable battery 336 via EHPM 408. In effect, the rechargeable battery 336 is recharged by the solar cell circuit 402, whereby the energy expended in charging and re-charging the SC storage element 414 is restored while the EST 200 is maintained in its fully operational state.

The above described process of using the rechargeable battery 336 to charge the SC storage element 414 is repeated as needed. Thus, the above described EST 200 performs self-monitoring and charges its respective re-chargeable elements throughout its entire operation.

Figure 5:
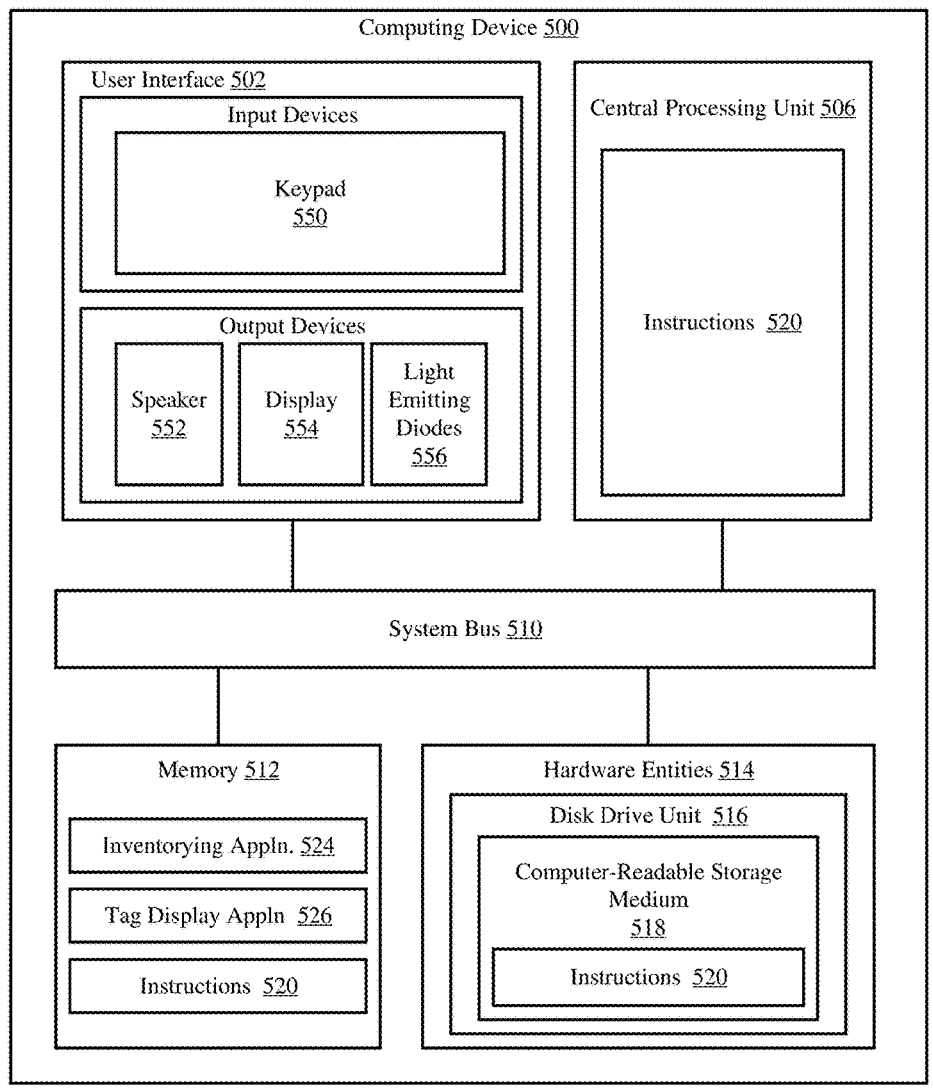
FIG. 5 is a block diagram of an illustrative architecture for a computing device.

Referring now to FIG. 5, there is provided a detailed block diagram of an exemplary architecture for a computing device 500. Computing device 112 of FIG. 1 is the same as or substantially similar to computing device 500. As such, the following discussion of computing device 500 is sufficient for understanding computing device 112.

Computing device 500 may include more or less components than those shown in FIG. 5. However, the components shown are sufficient to disclose an illustrative embodiment implementing the present solution. The hardware architecture of FIG. 5 represents one embodiment of a representative Computing device configured to facilitate improved inventory pricing management. As such, the computing device 500 of FIG. 5 implements at least a portion of a method for automatically and dynamically modifying item level information, accessory information, and/or related product information output from smart tags and/or ESLs in accordance with the present solution.

Some or all the components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit ("CPU") 506, a system bus 510, a memory 512 connected to and accessible by other portions of computing device 500 through system bus 510, and hardware entities 514 connected to system bus 510. The user interface can include input devices (e.g., a keypad 550) and output devices (e.g., speaker 552, a display 554, and/or light emitting diodes 556), which facilitate user-software interactions for controlling operations of the computing device 500.

At least some of the hardware entities 514 perform actions involving access to and use of memory 512, which can be a RAM, a disk driver and/or a Compact Disc Read Only Memory ("CD-ROM"). Hardware entities 514 can include a disk drive unit 516 comprising a computer-readable storage medium 518 on which is stored one or more sets of instructions 320 (e.g., software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 320 for execution by the computing device 500 and that cause the computing device 500 to perform any one or more of the methodologies of the present disclosure.

In some scenarios, the hardware entities 514 include an electronic circuit (e.g., a processor) programmed for facilitating item inventorying, merchandise sales, and/or customer satisfaction with a shopping experience. In this regard, it should be understood that the electronic circuit can access and run an inventorying application 524 and a tag display application 526 installed on the computing device 500. The software applications 524-526 are collectively generally operative to: obtain item level information and/or other information from smart tags and/or ESLs; program item level information, accessory information and/or related product information onto smart tags and/or ESLs; convert the language, pricing and/or currency symbol of item level information, accessory information and/or related product information; facilitate registration of smart tags and/or ESLs with enterprise systems; and/or determine when tag display update actions need to be taken based on smart tag information. Other functions of the software applications 524-526 will become apparent as the discussion progresses.

Figure 6A:
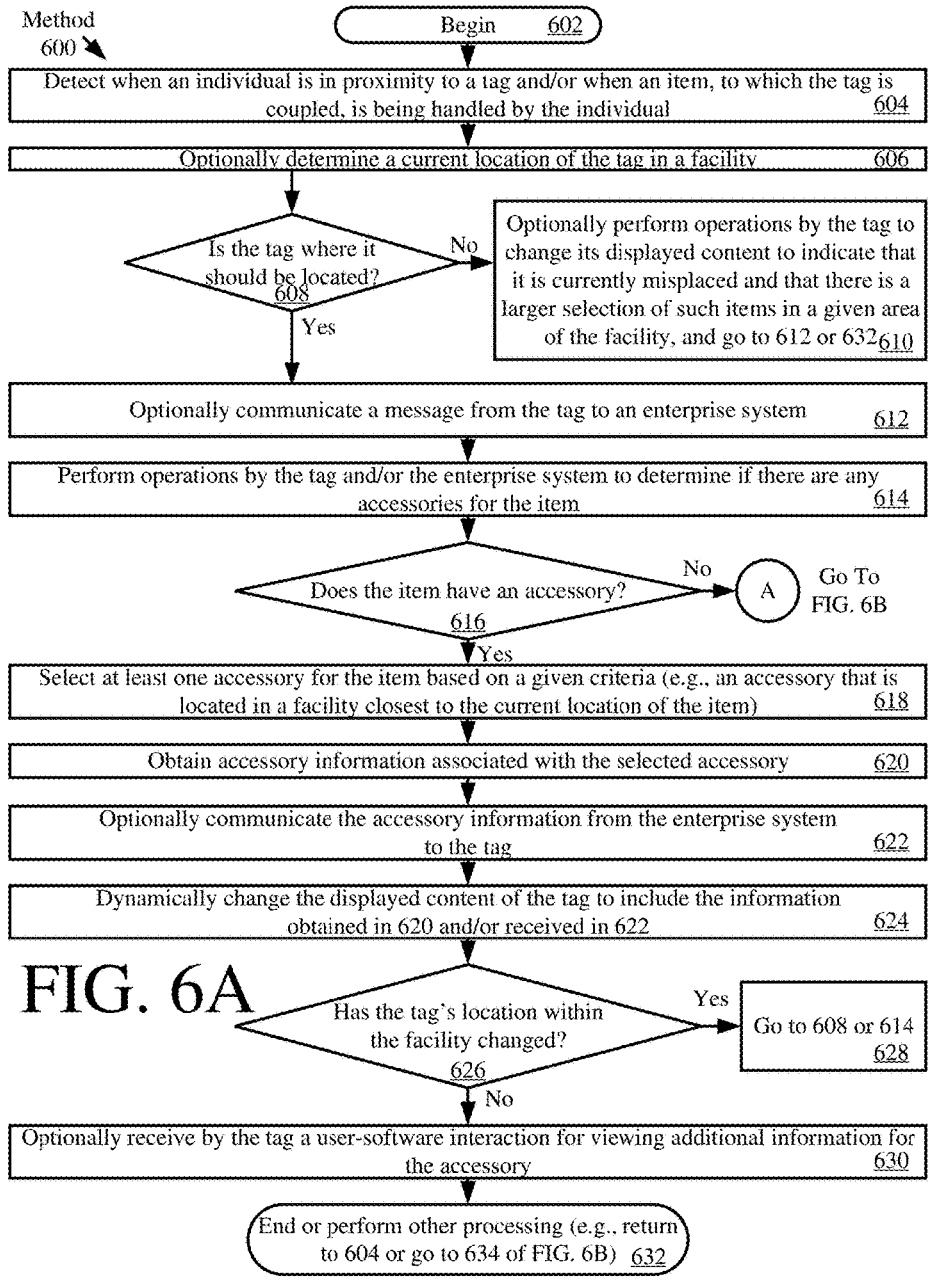
FIGS. 6A-6B (collectively referred to herein as "FIG. 6") provide a flow diagram of an illustrative method for dynamically changing displayed content of a tag.

Referring now to FIG. 6, there is provided a flow diagram of an illustrative method 600 for dynamically changing displayed content of a tag (e.g., smart tag 120 of FIG. 1 or 200 of FIGS. 2-3). Method 600 comprises operations performed in blocks 602-654. The present solution is not limited to the particular order in which the operations of blocks 602-654 are performed in FIG. 6. The location of one or more of the blocks of FIG. 6 can be changed.

As shown in FIG. 6, method 600 begins with 602 and continues with 604 where a detection is made by the tag (e.g., smart tag 120 of FIG. 1 or 200 of FIGS. 2-3). More particularly, sensor data is generated by one or more sensors (e.g., sensors 350 of FIG. 3) local to the tag. The sensor data is then analyzed to detect when an individual is in proximity to the tag and/or when an item (to which the tag is coupled) is being handled by the individual. Techniques for analyzing sensor data are well known in the art, and therefore will not be described herein. Any known or to be known sensor data analysis technique can be used herein without limitation.

In response to the detection of 604, the current location of the tag is optionally determined in 606 (e.g., by the tag's internal location module (e.g., location module 330 of FIG. 3)). Techniques for determining a tag's location are well known in the art, and therefore will not be described herein. Any known or to be known technique can be used herein without limitation.

Next in 608, a decision is optionally made as to whether the tag is where it should be located within a facility (e.g., facility 102 of FIG. 1). This decision can be made using a look up table comprising entries respectively associating tag unique identifiers with information specifying expected tag or item locations within a facility (e.g., facility 102 of FIG. 1).

If the tag is not where it should be located in the facility [608:NO], then method 600 continues with 610 where the tag optionally performs operations to change its displayed content to indicate that it is currently misplaced and that there is a larger selection of such items in a given area of the facility (e.g., aisle 2). Subsequently, method 600 continues with 612 or 632, which will be discussed below.

If the tag is where it should be in the facility [608:YES], then method 600 continues with 612 where a message is optionally communicated from the tag to an enterprise system (e.g., access point 128, network 110, and/or computing device 112 of FIG. 1). Thereafter in 614, operations are performed by the tag and/or the enterprise system to determine if there are any accessories for the item (e.g., item 118 of FIG. 1). An item/accessory relationship table (e.g., table 130 of FIG. 1) can be used in 614. The item/accessory relationship table can be stored in the tag's local memory and/or in a remote datastore (e.g., datastore 114 of FIG. 1). In some scenarios, the item/accessory relationship table comprises entries respectively associating item unique identifiers with accessory unique identifiers. If at least one accessory unique identifier is associated with the item's unique identifier in the item/accessory relationship table, then a determination is made that the item has an accessory. In contrast, if there are no accessory unique identifiers associated with the item's unique identifier in the item/accessory relationship table, then a determination is made that the item does not have an accessory.

If the item does not have any accessories [616:NO], then method 600 continues with 634-654 of FIG. 6B in which operations are performed for dynamically changing the tag's displayed content to include information for any related products. 634-654 will be discussed below in detail.

If the item does have one or more accessories [616:YES], then method 600 continues with 618 where at least one accessory is selected for the item based on a given criteria. For example, an accessory is selected from a plurality of accessories since it is located closest to the tag. The tag's current location, the item/accessory relationship table, and/or accessory information (e.g., accessory information 132 of FIG. 1) are used in this scenario to make the selection. The present solution is not limited in to the particulars of this example. Accessory information (e.g., accessory information 132 of FIG. 1) associated with the selected accessory is obtained in 620. 620 can involve obtaining accessory information for the selected accessory from a memory local to the tag (e.g., memory 308 of FIG. 3) and/or a remote datastore (e.g., datastore 114 of FIG. 1). Accordingly, the accessory information can be communicated from the enterprise system to the tag in some scenarios, as shown by optional 622. Next in 624, the displayed content of the tag is dynamically changed to include the accessory information.

Thereafter, the tag's location is monitored (e.g., by the tag's location module 330 of FIG. 3). If the tag's location within the facility has changed [626:YES], then 628 is performed where method 600 returns to 608 or 614. In contrast, if the tag's location within the facility has not changed [626:NO], then 630 is performed where the tag optionally receives a user-software interaction for viewing additional information for the accessory. In response to the user-software interaction, the tag can obtain and display the additional information for the accessory. The additional information can be obtained from a memory local to the tag (e.g., memory 308 of FIG. 3) and/or a remote datastore (e.g., datastore 114 of FIG. 1). Subsequently, 632 is performed where method 600 ends or other processing is performed (e.g., return to 604 or go to 634 of FIG. 6B).

Figure 6B:
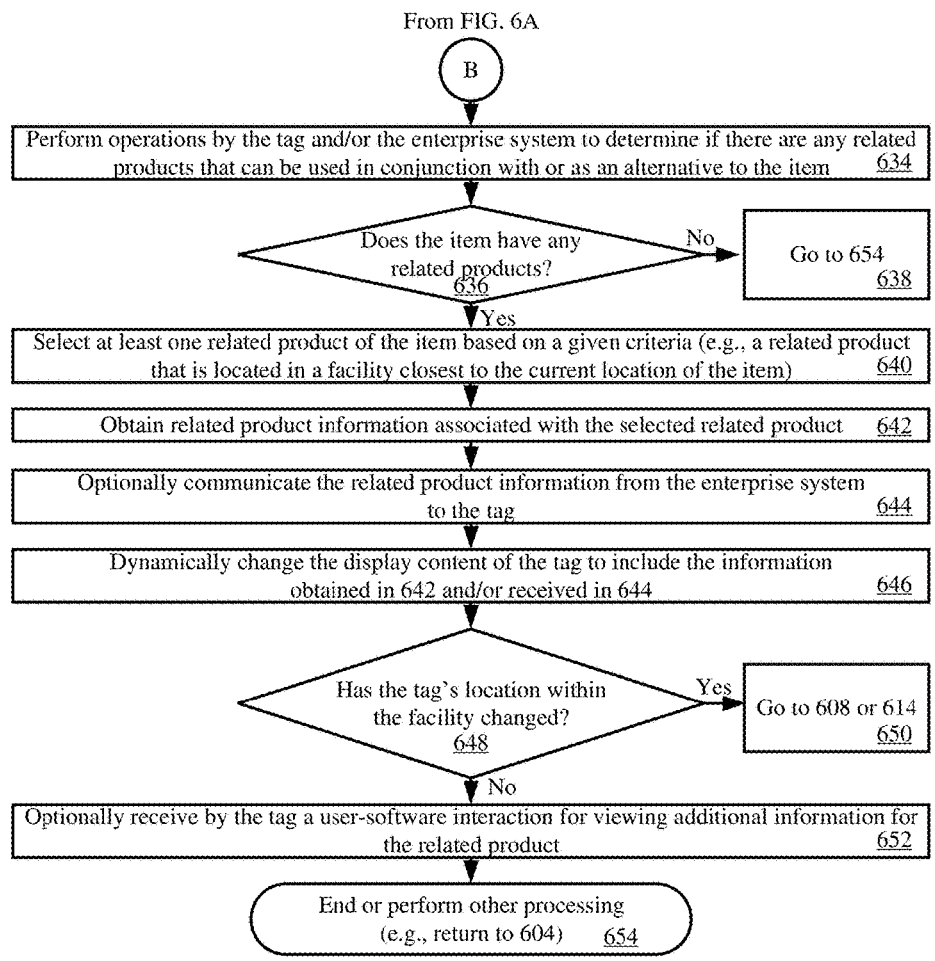

As shown in FIG. 6B, 634 involves performing operations by the tag and/or the enterprise system to determine if there are any related products that can be used in conjunction with or as an alternative to the item. An item/related products table (e.g., table 134 of FIG. 1) can be used in 634 to make the selection. This item/related products table can be stored in the tag's local memory (e.g., memory 308 of FIG. 3) and/or in a remote datastore (e.g., datastore 114 of FIG. 1). Accordingly, the determination can be made by the tag and/or a remote computing device (e.g., computing device 112 of FIG. 1). In some scenarios, the item/related products table comprises entries respectively associating item unique identifiers with related product unique identifiers. If at least one related product unique identifier is associated with the item's unique identifier in the item/related products table, then a determination is made that the item has a related product. In contrast, if there are no related product identifiers associated with the item's unique identifier in the item/related products table, then a determination is made that the item does not have any related products.

If the item does not have any related products [636:NO], then 638 is performed where method 600 continues with 654. In 654, method 600 ends or other processing is performed (e.g., return to 604).

In contrast, if the item does have one or more related products [636:YES], then 640-652 are performed. 640 involves selecting at least one related product of the item based on a given criteria). For example, a related product is selected from a plurality of related products since it is located closest to the tag. The tag's current location, the item/related products table, and/or related product information (e.g., related product information 136 of FIG. 1) are used in this scenario to make the selection. The present solution is not limited in to the particulars of this example.

Related product information (e.g., related product information 136 of FIG. 1) associated with the selected related product is obtained in 642. 642 can involve obtaining related product information for the selected related product from a memory local to the tag (e.g., memory 308 of FIG. 3) and/or a remote datastore (e.g., datastore 114 of FIG. 1). Accordingly, the related product information can be communicated from the enterprise system to the tag in some scenarios, as shown by optional 644. Next in 646, the displayed content of the tag is dynamically changed to include the related product information for the selected related product.

Thereafter, the tag's location is monitored (e.g., by the tag's location module 330 of FIG. 3). If the tag's location within the facility has changed [648:YES], then 650 is performed where method 600 returns to 608 or 614. In contrast, if the tag's location within the facility has not changed [648:NO], then 652 is performed where the tag optionally receives a user-software interaction for viewing additional information for the related product. In response to the user-software interaction, the tag can obtain and display the additional information for the related product. The additional information can be obtained from a memory local to the tag (e.g., memory 308 of FIG. 3) and/or a remote datastore (e.g., datastore 114 of FIG. 1). Subsequently, 654 is performed where method 600 ends or other processing is performed (e.g., return to 604).

Figure 7:
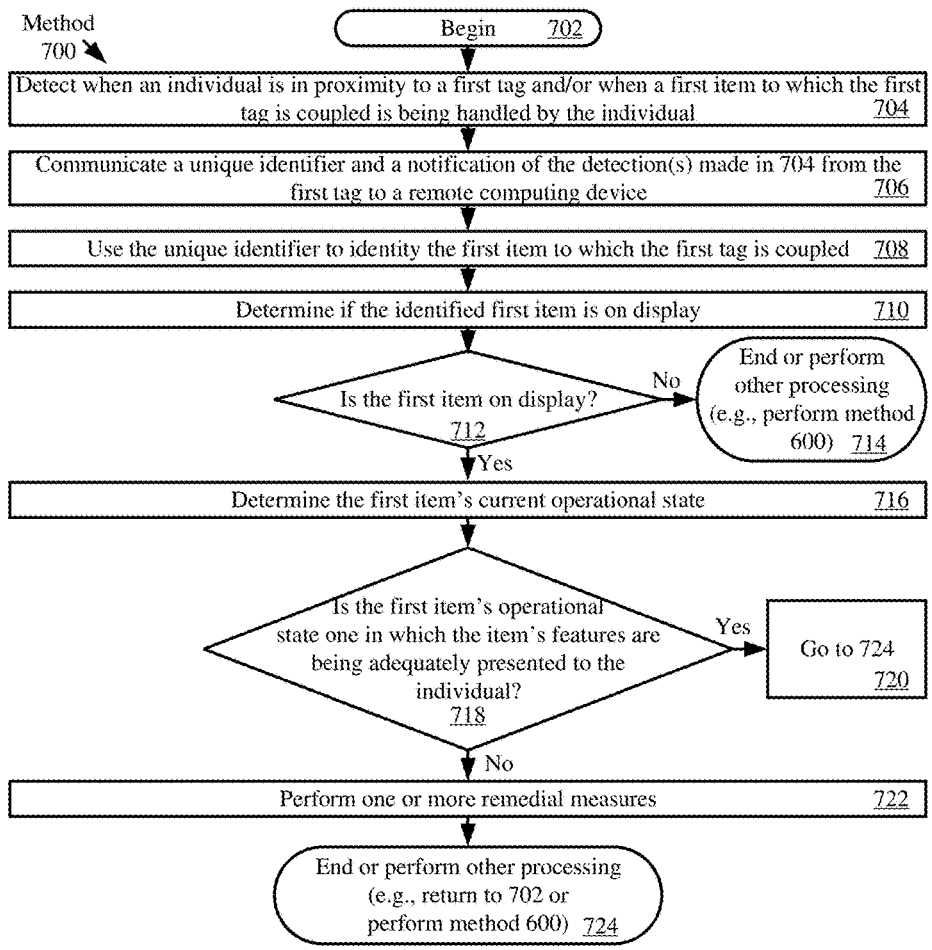
FIG. 7 is a flow diagram of an illustrative method for dynamically changing displayed content of a tag.

Referring now to FIG. 7, there is provided a flow diagram of an illustrative method 700 for dynamically changing displayed content of a tag (e.g., smart tag 120 of FIG. 1). Method 700 comprises operations performed in blocks 702-724. The present solution is not limited to the particular order in which the operations of blocks 702-724 are performed in FIG. 7. The location of one or more of the blocks of FIG. 7 can be changed.

As shown in FIG. 7, method 700 begins with 702 and continues with 704 where a detection is made by the tag. More particularly, sensor data is generated by one or more sensors (e.g., sensors 350 of FIG. 3) local to the tag (e.g., smart tag 120 of FIG. 1 or 200 of FIGS. 2-3). The sensor data is then analyzed to detect when an individual is in proximity to a tag and/or when an item (to which the tag is coupled) is being handled by the individual. In response to this detection, the tag communicates a unique identifier (e.g., the first tag's unique identifier or the first item's unique identifier) and a notification of the detection(s) made in 704 to a remote computing device (e.g., computing device 112 of FIG. 1), as shown in 706. In 708, the unique identifier is used by the remote computing device to identify the first item (e.g., item 118 of FIG. 1) to which the tag is coupled. For example, if the unique identifier is the tag's unique identifier, then a look up table is used to obtain associated information identifying the first item to which the tag is coupled (e.g., the first item's unique identifier). The present solution is not limited to the particulars of this example.

Next, the computing device determines if the first item is on display, as shown by 710. This determination can be made using a look up table or list comprising entries identifying which items of a plurality of items in a facility (e.g., facility 102 of FIG. 1) are on display. For example, the first item's unique identifier obtained in 708 is compared to each unique identifier of a plurality of unique identifiers contained in a look up table or list to determine if a match exists therebetween. If a match does exist, then a determination is made that the first item is on display. If a match does not exist between the first item's unique identifier and all of the unique identifiers contained in the look up table or list, then a determination is made that the first item is not on display.

If the first item is not on display [712:NO], then 714 is performed where method 700 ends or other processing is performed (e.g., method 600 is performed). If the first item is on display [712:YES], then 716 is performed where the operational state of the first item is determined. This determination can be made by: analyzing an image or video captured by a camera in the vicinity of the first item; analyzing audio captured by a microphone in the vicinity of the first item; communicating with the first item (e.g., via radio communications); and/or accessing information manually input into the enterprise system (e.g., network 110, computing device 112 and database 114 of FIG. 1).

If the first item's operational state is one in which it's features are being adequately presented to the individual [718:YES], then 720 is performed where method 700 continues with 724. In 724, method 700 ends or other processing is performed (e.g., method 700 returns to 702 or continues with method 600 of FIG. 6).

If the first item's operational state is not one in which it's features are being adequately presented to the individual [718:NO], then method 700 continues with 722 where one or more remedial measures are taken. The remedial measure can include, but are not limited to, causing the first tag's display to indicate that a fully operational item of the same type is on display in a given area of a facility, causing a second tag of the fully operational displayed item to include an output for capturing the individual's interest, and/or notifying store personnel of the individual's interest in the first item and the first item's current operational state. The store personnel can use this information to determine whether (s)he should go to the first item's location and interact with the first item to change its operational state. Subsequently, 724 is performed where method 700 ends or other processing is performed (e.g., return to 702 or continue with method 600 of FIG. 6).

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for dynamically changing displayed content of a first tag, comprising:
   detecting when an individual is in proximity to the first tag or when an item, to which the first tag is coupled, is being handled by the individual;
   determining whether the first tag is where the first tag should be located in a facility;
   performing the following operations when a determination is made that the first tag is where the first tag should be located in the facility:
      identifying at least one first accessory for the item or at least one first related product that can be used in conjunction with or as an alternative to the item;
      obtaining information for the identified at least one first accessory or related product that is to be presented to the individual; and
      dynamically changing the displayed content of the first tag to include the obtained information while the individual is still in proximity to the first tag or handling the item;
   changing the displayed content of the first tag to indicate that the first tag is currently misplaced, when a determination is made that the first tag is not where the first tag should be located in the facility.

2. The method according to claim 1, further comprising changing the displayed content of the first tag to indicate that there is a larger selection of the same or similar items in a given area of the facility, when a determination is made that the first tag is not where the first tag should be located within the facility.

3. The method according to claim 1, further comprising selecting the at least one first accessory from a plurality of accessories based on the item's current location and the locations of the accessories.

4. The method according to claim 1, further comprising selecting the at least one first related product from a plurality of related products based on the item's current location and locations of the related products.

5. The method according to claim 1, further comprising:
   monitoring the first tag's location within the facility to detect when the first tag's physical location changes; and
   dynamically changing the displayed content to include information for at least one second accessory or related product that is physically located closest to the first tag's new physical location.

6. The method according to claim 1, further comprising receiving by the first tag a user-software interaction to view additional information for the at least one first accessory or related product.

7. The method according to claim 1, further comprising:
   determining an operational state of the item when (a) the item is on display and (b) a detection has been made that the individual is in proximity to the first tag or that the item is being handled by the individual; and
   performing at least one remedial measure when the operational state is not one in which the item's features are being adequately presented to the individual.

8. The method according to claim 7, wherein the at least one remedial measure comprises:
   causing the first tag's display to indicate that a fully operational item of the same type is on display in a given area of a facility;
   causing a second tag of the fully operational displayed item to include an output for capturing the individual's interest; or
   notifying store personnel of the individual's interest in the item and the item's current operational state.

9. A system, comprising:
a first tag comprising a sensor to detect when an individual is in proximity to the first tag or when an item, to which the first tag is coupled, is being handled by the individual;
a processor comprising at least one of the first tag and a remote computing device; and
a non-transitory computer-readable storage medium comprising programming instructions that are configured to cause the processor to implement a method for dynamically changing displayed content of the first tag, wherein the programming instructions comprise instructions to:
determine whether the first tag is where the first tag should be located in the facility;
cause the following operations to be performed when a determination is made that the first tag is where the first tag should be located in the facility:
identifying at least one first accessory for the item or at least one first related product that can be used in conjunction with or as an alternative to the item, in response to a detection that the individual is in proximity to the first tag or that the item is being handled by the individual;
obtaining information for the identified at least one first accessory or related product that is to be presented to the individual; and
causing the displayed content of the first tag to be dynamically changed to include the obtained information while the individual is still in proximity to the first tag or handling the item; and
change the displayed content of the first tag to indicate that the first tag is current misplaced, when a determination is made that the first tag is not where the first tag should be located in the facility.

10. The system according to claim 9, wherein the programming instructions further comprise instructions to change the displayed content of the first tag to indicate that there is a larger selection of the same or similar items in a given area of the facility, when a determination is made that the first tag is not where the first tag should be located within the facility.

11. The system according to claim 9, wherein the programming instructions further comprise instructions to select the at least one first accessory from a plurality of accessories based on the item's current location and the locations of the accessories.

12. The system according to claim 9, wherein the programming instructions further comprise instructions to select the at least one first related product from a plurality of related products based on the item's current location and locations of the related products.

13. The system according to claim 9, wherein the programming instructions further comprise instructions to:
monitor the first tag's location within the facility to detect when the first tag's physical location changes; and
dynamically change the displayed content to include information for at least one second accessory or related product that is physically located closest to the first tag's new physical location.

14. The system according to claim 9, wherein the first tag receives a user-software interaction to view additional information for the at least one first accessory or related product.

15. The system according to claim 9, wherein the programming instructions further comprise instructions to:
determine an operational state of the item when (a) the item is on display and (b) a detection has been made that the individual is in proximity to the first tag or that the item is being handled by the individual; and
perform at least one remedial measure when the operational state is not one in which the item's features are being adequately presented to the individual.

16. The system according to claim 15, wherein the at least one remedial measure comprises:
causing the first tag's display to indicate that a fully operational item of the same type is on display in a given area of a facility;
causing a second tag of the fully operational displayed item to include an output for capturing the individual's interest; or
notifying store personnel of the individual's interest in the item and the item's current operational state.

17. A method for dynamically changing displayed content of a first tag, comprising:
detecting when an individual is in proximity to the first tag or when an item, to which the first tag is coupled, is being handled by the individual;
identifying at least one first accessory for the item or at least one first related product that can be used in conjunction with or as an alternative to the item;
obtaining information for the identified at least one first accessory or related product that is to be presented to the individual;
dynamically changing the displayed content of the first tag to include the obtained information while the individual is still in proximity to the first tag or handling the item;
determining whether the first tag is where the first tag should be located within a facility; and
changing the displayed content of the first tag to indicate that the first tag is currently misplaced, when a determination is made that the first tag is not where the first tag should be located within the facility.

18. A system, comprising:
a first tag comprising a sensor to detect when an individual is in proximity to the first tag or when an item, to which the first tag is coupled, is being handled by the individual;
a processor comprising at least one of the first tag and a remote computing device; and
a non-transitory computer-readable storage medium comprising programming instructions that are configured to cause the processor to implement a method for dynamically changing displayed content of the first tag, wherein the programming instructions comprise instructions to:
identify at least one first accessory for the item or at least one first related product that can be used in conjunction with or as an alternative to the item, in response to a detection that the individual is in proximity to the first tag or that the item is being handled by the individual;
obtain information for the identified at least one first accessory or related product that is to be presented to the individual; and
cause the displayed content of the first tag to be dynamically changed to include the obtained information while the individual is still in proximity to the first tag or handling the item;
wherein the programming instructions further comprise instructions to change the displayed content of the first tag to indicate that the first tag is currently misplaced, when a determination is made that the first tag is not where the first tag should be located within the facility.

* * * * *